US010186936B2

(12) United States Patent
Fröhlich et al.

(10) Patent No.: US 10,186,936 B2
(45) Date of Patent: Jan. 22, 2019

(54) ELECTRIC MACHINE WITH A BAFFLE

(71) Applicant: CONTINENTAL AUTOMOTIVE GMBH, Hannover (DE)

(72) Inventors: Holger Fröhlich, Berlin (DE); David Charles, Berlin (DE); Robert Krause, Berlin (DE); Arnoud Smit, Nürnberg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/695,113

(22) Filed: Sep. 5, 2017

(65) Prior Publication Data

US 2017/0366074 A1 Dec. 21, 2017

Related U.S. Application Data

(63) Continuation of application No. PCT/EP2016/054147, filed on Feb. 26, 2016.

(30) Foreign Application Priority Data

Mar. 6, 2015 (DE) ........................ 10 2015 204 026

(51) Int. Cl.

*H02K 11/33* (2016.01)
*H02K 9/06* (2006.01)
*H02K 9/22* (2006.01)

(52) U.S. Cl.

CPC ............... *H02K 11/33* (2016.01); *H02K 9/06* (2013.01); *H02K 9/22* (2013.01)

(58) Field of Classification Search

CPC ............. H02K 11/33; H02K 9/06; H02K 9/22
See application file for complete search history.

(56) References Cited

U.S. PATENT DOCUMENTS 2,750,521 A * 6/1956 Wightman ............. H02K 17/16 310/211
4,009,405 A 2/1977 Gleichman
(Continued)

FOREIGN PATENT DOCUMENTS

DE 2236162 A1 2/1973
DE 102006013089 A1 10/2007
(Continued)

OTHER PUBLICATIONS

International Search Report and Written Opinion dated May 18, 2016 from corresponding International Patent Application No. PCT/EP2016/054147.
(Continued)

*Primary Examiner* — Dang Le

(57) ABSTRACT

The disclosure relates to an electric machine having a stator, a rotor and an inverter arranged in an inverter housing. The rotor is rotatably mounted about a rotational axis with its rotor axis in a first end shield and in a second end shield. The second end shield is arranged in or on the inverter housing. At least one suction opening and at least one blowing opening are arranged on the radial periphery of the second end shield. At least two cooling fins are provided on the second end shield, a baffle is arranged between the cooling fins of the second end shield and the stator and the rotor which is arranged in the stator, such that a cooling medium flowing radially through the at least one suction opening is guided to the at least one blowing opening.

8 Claims, 9 Drawing Sheets

(56) References Cited

U.S. PATENT DOCUMENTS

| | | | | |
|---|---|---|---|---|
| 9,689,264 | B2 * | 6/2017 | Cocks | F01D 5/141 |
| 2009/0108714 | A1 | 4/2009 | Fakes | |
| 2015/0054363 | A1 | 2/2015 | Shimano et al. | |

FOREIGN PATENT DOCUMENTS

| | | | |
|---|---|---|---|
| DE | 102009046152 | A1 | 5/2011 |
| DE | 102009046192 | A1 | 5/2011 |
| DE | 102011003189 | A1 | 7/2012 |
| EP | 2773030 | A2 | 9/2014 |
| JP | H07184349 | A | 7/1995 |
| JP | 2014064345 | A | 4/2014 |
| JP | 5661167 | B1 | 12/2014 |
| JP | 5674900 | B1 | 2/2015 |

OTHER PUBLICATIONS

German Office Action dated Feb. 5, 2016 for corresponding German Patent Application No. 10 2015 204 026.7.

* cited by examiner

ELECTRIC MACHINE WITH A BAFFLE

CROSS-REFERENCE TO RELATED APPLICATIONS

This application claims the benefit of PCT Application PCT/EP2016/054147, filed Feb. 26, 2016, which claims priority to German Application DE 10 2015 204 026.7, filed Mar. 6, 2015. The disclosures of the above applications are incorporated herein by reference.

TECHNICAL FIELD

The present disclosure relates to an electric machine having a baffle for guiding a cooling medium.

BACKGROUND

Modern vehicles, in particular electric vehicles, are driven by electric motor arrangements which each have an electric machine for driving the vehicle and power electronics for providing phase currents for the electric machine. Due to the physical properties of the electric machine and of the power electronics, power losses in the form of waste heat occur during operation of such electric motor arrangements, said power losses leading to an increase in temperature of the electric motor arrangement. A high intrinsic temperature of the electric motor arrangement can lead to a power loss of the electric machine and in extreme cases even to failure of the power electronics. In order to prevent this, the waste heat has to be discharged before damage arises.

For this purpose, double-sided cooling systems have been proposed in which, however, mounting stiffness of a rotor is reduced by the introduction of ventilation openings. A further problem results from the fact that high-temperature air drawn in cannot cool a bearing outer ring, and so the rotor bearings become prematurely worn due to temperature.

SUMMARY

The disclosure provides an electric machine which avoids the abovementioned drawbacks and with which effective cooling with high cooling power and a minimum space requirement is achieved.

One aspect of the disclosure provides an electric machine that has a stator, a rotor, and an inverter arranged in an inverter housing. The rotor is mounted so as to be rotatable about an axis of rotation with its rotor axis in a first end shield and a second end shield. The second end shield is arranged in or on the inverter housing. At least one intake opening and at least one blow-out opening are arranged in a radially encircling outer surface of the second end shield. Furthermore, at least two cooling fins are present on the second end shield. A baffle is arranged between the cooling fins of the second end shield and the stator and also the rotor that a cooling medium flowing in radially through the at least one intake opening is guided to the at least one blow-out opening.

As a result of the inverter being integrated into the second end shield having cooling fins, or as a result of the inverter, i.e. power and/or control electronics, being mounted axially on the end shield with regard to the axis of rotation, not only is a machine of small size allowed but also dissipation of heat is supported. Since the second end shield is in direct mechanical contact with the inverter housing, the heat may be dissipated efficiently. The cooling of the rotor by the baffle and when air is used as the cooling medium of an air baffle or of a partition wall and the resultant deflection of a flow of cooling medium from an inflow duct into an outflow duct supports efficient cooling of the entire machine, without it being necessary to change the size of the machine. As a result of the deflection of the cooling medium with the aid of the baffle, it is possible to guide the air typically drawn-in radially as cooling medium around an entire circumference of the end shield or of the inverter housing radially inward via cooling fins. A housing surface that acts for heat output is thus increased in size and heat exchange and thus cooling of the components of the inverter, i.e. control and power electronics, is optimized. This results in greater reliability and service life of the electronic components of the entire set-up.

Implementations of the disclosure may include one or more of the following optional features. In some implementations, a plurality of intake openings and blow-out openings are provided both in the first end shield and in the second end shield in order for the cooling medium to be able to be used for cooling with a high volume throughput. The intake openings may be arranged axially in the first end shield, whereas the blow-out openings may be arranged radially in the first end shield and in the second end shield. In some examples, the intake opening and the blow-out opening are in the form of a slot.

In some implementations, the rotor has a respective short-circuiting ring at two mutually opposite end sides that face in the direction of the end shields. The impeller blades are then arranged or formed on the short-circuiting ring or on the short-circuiting rings, in order to draw in the cooling medium with a high throughput and blow it out again via end windings. As a result of the impeller blades being integrally formed on the short-circuiting rings, a space-saving arrangement of the impeller blades needed for cooling is produced. The stiffness of a rotor mounting on the floating bearing side is typically improved in that no axial apertures have to be made in the end shield.

As a result, a double fan system is formed in suction operation and the cooling of the rotor and of the inverter takes place in two mutually independent circuits. Advantageously, cooling is improved by the cooling-medium guidance and an increase in size of a heat transfer surface, for example by way of the cooling fins, for the cooling medium flowing from the outside inward and also via optimization of heat transfer to components of the inverter as control and power electronics.

In order to configure air guidance with as little swirl as possible and to reduce flow losses, an air guiding sleeve with or without blades is employed upstream of an inlet into the impeller.

Furthermore, the impeller blades may be formed in a curved manner counter to a direction of rotation of the rotor in the electric machine. This allows an advantageous flow behavior of the cooling medium.

The cooling fins integrally formed on the second end shield are typically oriented in a manner extending radially outward starting from a central bearing seat. In some examples, a tube row spacing of the cooling fins decreases with reducing diameter. Alternatively or additionally, a cavity ratio may remain constant as the diameter reduces. Furthermore, an offset arrangement of cooling fins or pins per tube row may also be provided.

Typically, the cooling fins are formed with a cross section that is circular or extends in a straight or curved manner from the direction of the axis of rotation as seen in plan view, i.e. as plate-like or needle fins. As a result, a flow behavior of the cooling medium can be influenced as desired.

The impeller blades may be one piece or integrally with the short-circuiting ring or the rotor, such that there is a cohesive connection.

The second end shield and the inverter housing may be in one piece or integrally, i.e. as a single component.

The described electric machine is typically used as an electric motor, preferably in an electric vehicle.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
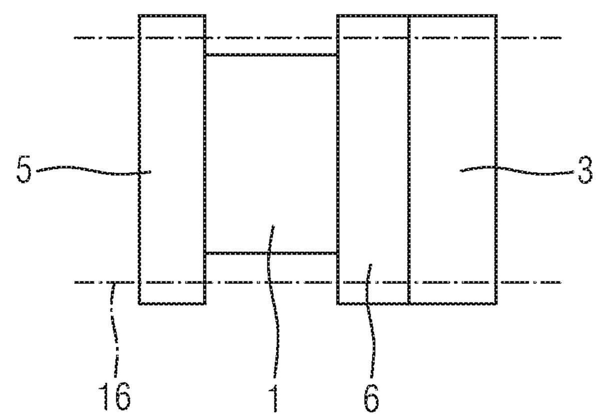
FIG. 1 shows a schematic illustration of an electric machine.

In some implementations, FIG. 1 shows a schematic view of an electric machine having a stator 1, a first end shield 5, a second end shield 6 and an inverter housing 3. The abovementioned components are connected together by a screw connection 16. The first end shield 5 and the second end shield 6 are spaced apart from one another but connected together by the stator 1. The second end shield 6 is immediately touching, i.e. in direct contact with the inverter housing 3. The electric machine may be built without or with a housing. If a housing is used, an inverter is integrated into the latter by axial attachment of the inverter housing 3 to the motor housing. FIG. 1 shows an electric motor arrangement, optimized in terms of installation space and cost, with a housing-free design of the motor.

Figure 2:
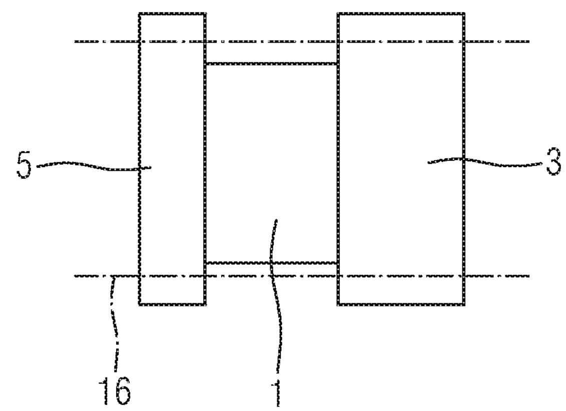
FIG. 2 shows a schematic illustration of a further embodiment of the electric machine with integrated end shield.

Referring to FIG. 2, in some examples, the second end shield 6 is integrated into the inverter housing 3 to achieve better heat discharge with a simultaneously reduced volume of the electric machine. As a result of a degree of integration that is realized in the example shown in FIG. 2, additional installation space may be saved, since a floating bearing of a rotor mounting is arranged in an integrated manner in the inverter housing 3. The electric machine itself may be an electric motor which is used in an electric vehicle. Recurring features are provided with identical reference signs in this figure and in the following figures.

Figure 3:
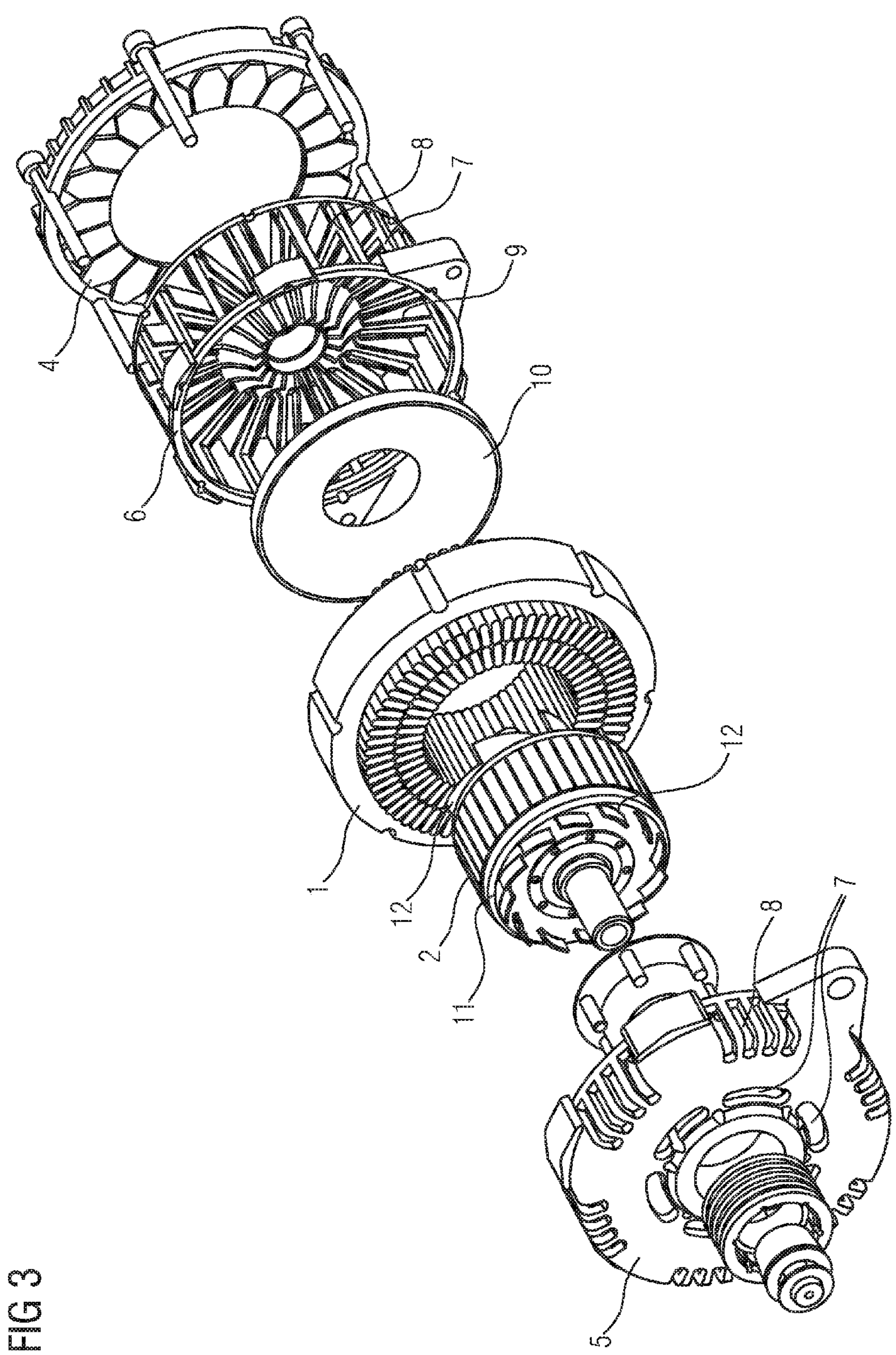
FIG. 3 shows an exploded illustration of the electric machine.

FIG. 3 illustrates the electric machine in an exploded view. The first end shield 5 has a plurality of intake openings 7 that are arranged axially and through which air is drawn in as cooling medium. A plurality of intake openings 7 and a plurality of blow-out openings 8 are arranged in the second end shield 6 on an outer face encircling an axis of rotation, such that air is drawn in and blown out radially here. The first end shield 5 has blow-out openings 8 arranged radially in the same way. The rotor 2 is mounted in both end shields 5 and 6 and can rotate in the stator 1. A short-circuiting ring 11 with integrally formed impeller blades 12 is attached to mutually opposite sides of the rotor 2, each facing one of the end shields 5, 6. The axis of rotation extends centrally through the components of the electric machine.

This results in a compact drive with double-sided air cooling. The electric machine with an integrated inverter 4 has an optimized cooling power with a simultaneously minimum space requirement for a housing structure. The cooling takes place by way of two fans which are inherent to the motor and which are arranged on the short-circuiting rings 11 in the illustrated example. The inverter 4 is arranged in an encapsulated manner in the inverter housing 3.

In addition, an air baffle 10 is provided between the second end shield 6 and the rotor 2 or the stator 1, the air being diverted by the air baffle 10.

Figure 4:
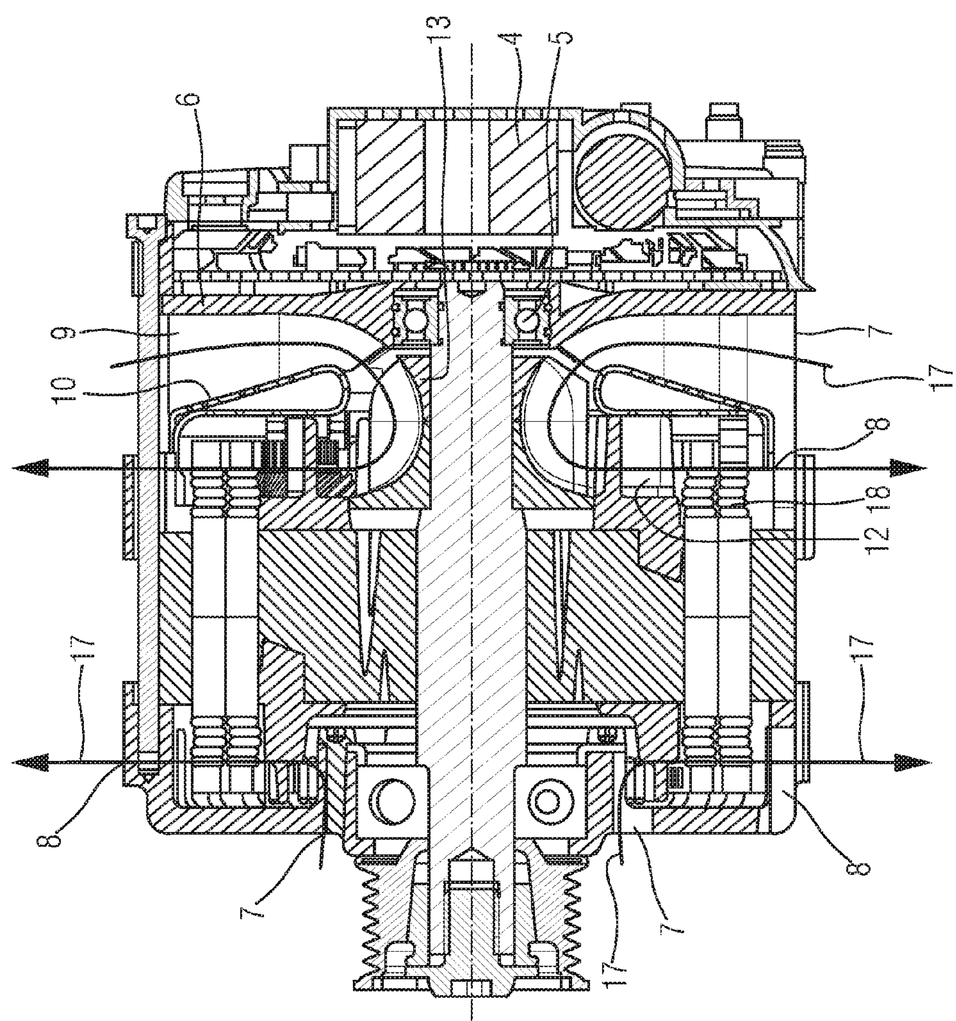
FIG. 4 shows a sectional illustration of the electric machine.

The function of the air baffle 10 and of the air guiding sleeve 13 is explained in the sectional illustration shown in FIG. 4. In some examples, an air flow 17 through the intake opening 7 is diverted by the air baffle 10 from an inflow duct into an outflow duct to the blow-out opening 8. On the drive-output side, axial intake takes place via axial slots in the first end shield 5 and radial blowing-out takes place via a stator end winding 18. On the drive-input side, radial intake takes place via the cooling fins 9 of the second end shield 6 and radial blowing-out takes place via the stator end winding 18. The impeller blades 12 are in this case adjacent to the respective stator end winding 18. In order for it to be possible to cool both end windings 18 of the stator 1, the impeller blades 12 are attached to the rotor 2 axially.

In contrast to the prior art, the second end shield 6 does not experience any loss of stiffness through axial air-inlet slots due to a structural interpretation of the radial intake principle in conjunction with the air guiding geometry on the floating-bearing side. The air is not drawn in axially on the floating-bearing side, but radially. This allows, via the cooling fins 9 attached to the second end shield 6, both effective cooling of the inverter housing 3 that is integrated or connected to the motor housing, and also high intrinsic stiffness of the second end shield 6 and thus high stiffness of the rotor mounting. The radial intake of air allows the targeted use of cooling fins 9, which, in addition to cooling, also increase the mechanical strength of the second end shield 6 and may also reduce the noise emission of the machine by suppression of surface vibrations.

As a result of the arrangement illustrated, good cooling of the floating bearing, which is the bearing that is exposed most to high temperatures, is achieved. Due to the radial intake of cooling air, a large annular area, starting at the outer circumference, is obtained for providing the second end shield 6 or the inverter housing 3 with fins. As a result of the double-sided air cooling, the drive-output side is less exposed to high temperatures, simply by cooling of the end winding, than the drive-input side (floating-bearing side), where the inverter 4 and the end winding 18 have to be cooled. As a result of the cooling of the inverter 4 and end winding 18, there is a temperature gradient within the stator 1, or in the electric machine. Due to this temperature gradient and as a result of good thermal conductivity of the winding, the heat that arises on the drive-input side due to the motor and the inverter 4 may also be discharged via the drive-output side, with the result that the cooling power effected is increased on the drive-input side. As such, it is possible to dimension the impeller blades 12 connected to the rotor 2 in a manner corresponding to the available installation space and not simply in accordance with the cooling power to be effected per side. As a result, a design that is optimized in terms of installation space is achieved for the electric machine with an integrated inverter 4.

Figure 5:
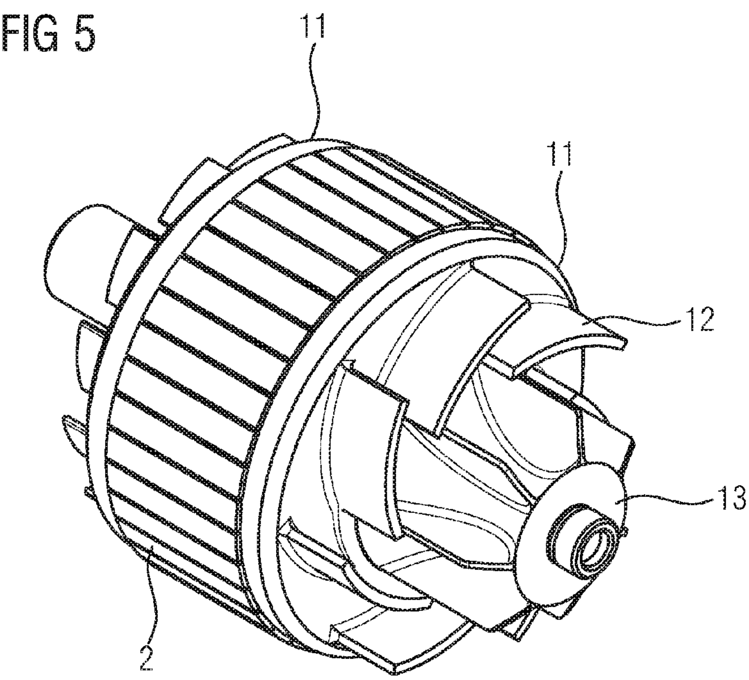
FIG. 5 shows a perspective view of a rotor.

FIG. 5 shows a perspective view of the rotor 2 having an air guiding sleeve 13 with blades and also having short-circuiting rings 11 arranged on mutually opposite sides. The rotor 2 is provided at the short-circuiting rings 11 with impeller blades 12 arranged integrally on the latter.

Figure 6:
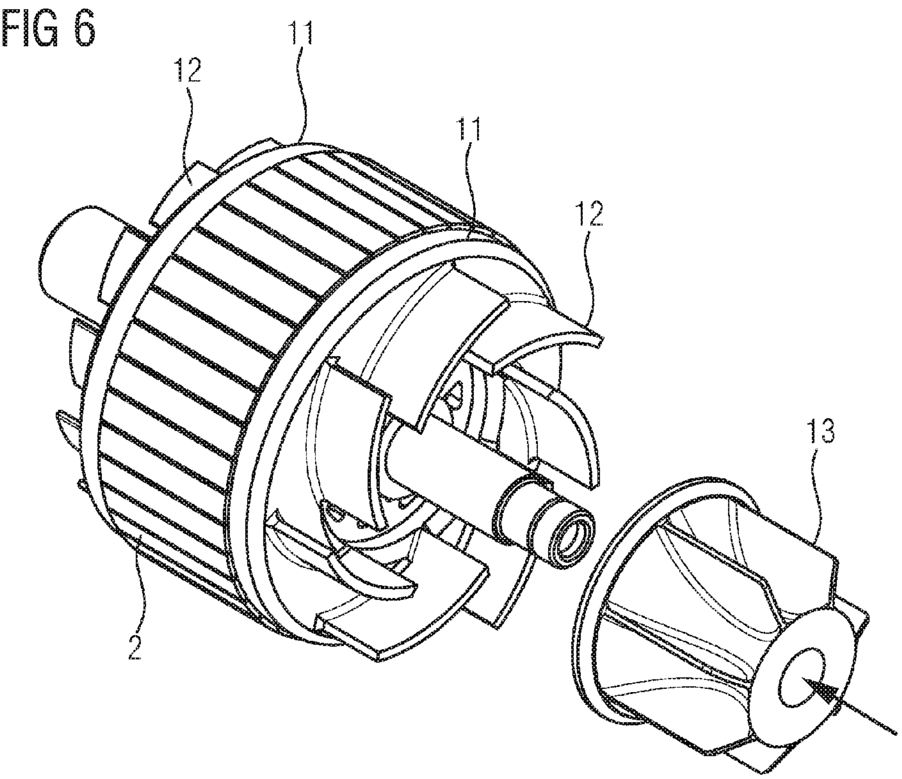
FIG. 6 shows a perspective view, corresponding to FIG. 5, of the rotor with an air guiding sleeve.

The rotor 2 having the short-circuiting rings 11 and the impeller blades 12 is reproduced in FIG. 6 in an illustration corresponding to FIG. 5. In addition, the air guiding sleeve 13 that is able to be mounted on a rotor axis is illustrated with blades. The impeller blades 12 are shown as rearwardly curved blades and are typically curved counter to a direction of rotation of the rotor 2 in the electric machine.

Figure 7:
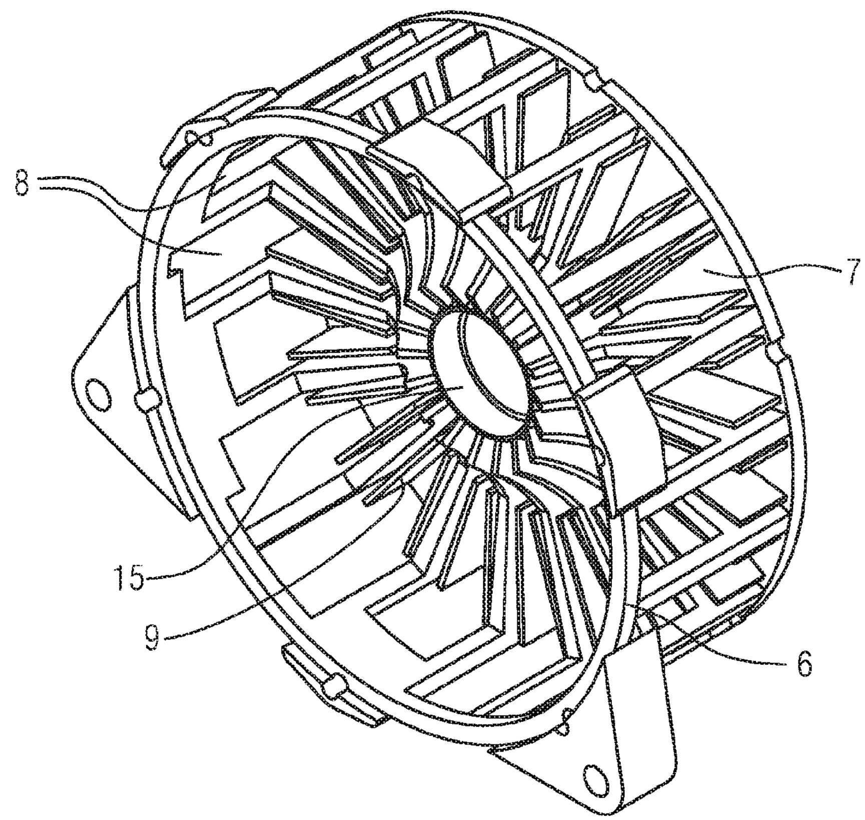
FIG. 7 shows a perspective view of the end shield.

FIG. 7 shows a perspective view of the second end shield 6 with cooling fins 9 arranged thereon. To achieve a cooling power that is as high as possible with regard to the axially arranged inverter housing 3, heat transfer surfaces in the form of plate-like or needle fins are formed on the second end shield 6. In this way, the radially drawn-in air can be guided radially inward around the entire circumference of the second end shield 6 or of the inverter housing 3. The housing surface that acts for heat output is thus enlarged and the heat exchange and thus the cooling of the components of the control and power electronics is optimized. This results in greater reliability and a longer service life of the electronic components of the entire set-up.

In some implementations, referring to FIG. 7, plate-like fins having a straight cross section from the direction of the axis of rotation as seen in plan view are used. In some examples, the second end shield 6 and thus also the cooling fins 9 are made of a material with good thermal conductivity, such as, but not limited to, an aluminum alloy, which is used in the pressure-casting process. The fin structure is kept as fine as possible, such that the cooling fins 9 have as large a surface area as possible, and a thick fin root is used, such that there is better heat conduction. A greater fin density results in an increase in the heat output surface and thus in greater efficiency for cooling. The cooling fins 9 are configured with different lengths as shown in FIG. 7. Furthermore, the second end shield 6 has a plurality of intake openings 7 and also a plurality of radial blow-out openings 8, which are arranged in an encircling outer surface of the second end shield 6.

As a result of a radial intake principle, air is guided radially inward around an entire circumference of the second end shield 6. Short individual fins serve to keep a temperature gradient in a flow enclosing the fins high in a targeted manner after at most ten times a hydraulic diameter and subsequent transfer of a following fin row into an outlet flow of an upstream duct.

Cross-sectional through-flow, considered to be tube flow, through the fin ducts is initially a mixed flow until a hydrodynamic and thermal run-in length has been reached. In this region, there are two forms of flow, the free laminar or turbulent upper flow and the increasing boundary layer flow present at each particular cooling fin 9. The boundary layer flow has enormous turbulence, which significantly increases heat transfer, and at the same time, the upper flow can pass through the cooling fins in a largely undisturbed manner. However, this is only the case until the boundary layer has formed, i.e., its thickness has increased to half the tube diameter.

By deliberately having the boundary layer “tear off” before the thermal and hydrodynamic run-in length has been reached, precisely this effect of greater heat transfer is exploited and, by transfer of the cooling fins 9, this effect is newly applied for each row of fins.

Figure 8:
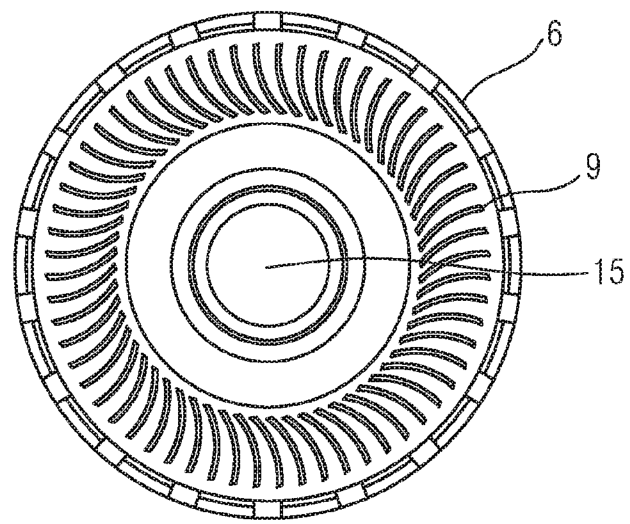
FIG. 8 shows a plan view of the end shield with curved cooling fins.

FIG. 8 shows a plan view, as seen from the direction of the axis of rotation, of the second end shield 6 with a centrally arranged bearing seat 15 for receiving the rotor axis and cooling fins 9 encircling the bearing seat 15. The cooling fins 9 are shown in a curved manner, this having the advantage of preswirl. The cooling fins 9 also do not all have to be the same length, but can alternately also have different lengths.

Figure 9:
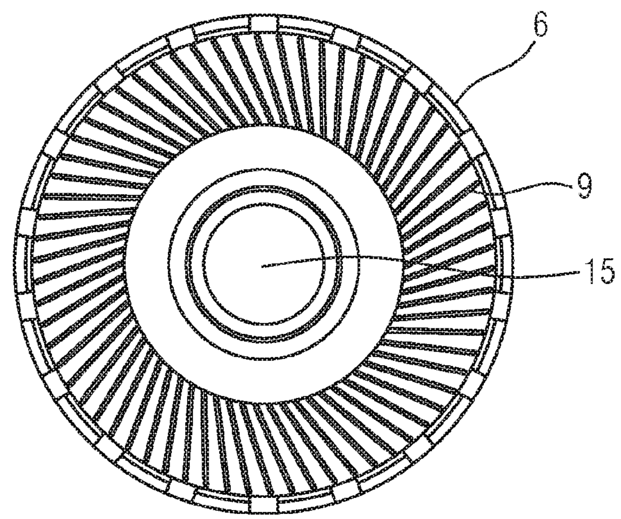
FIG. 9 shows a plan view of the end shield with straight cooling fins.
Figure 10:
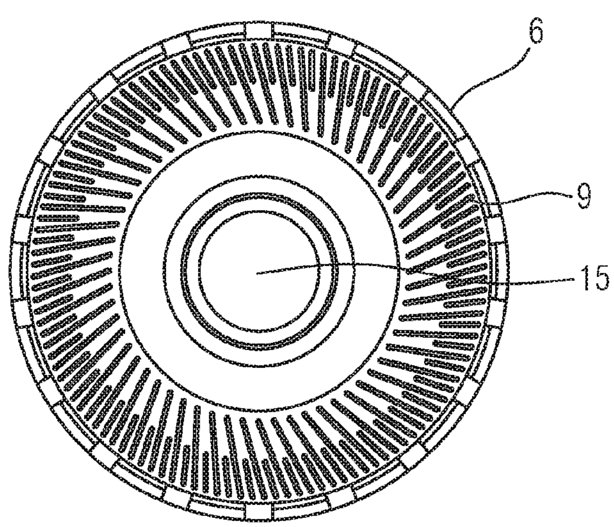
FIG. 10 shows a plan view of the end shield with cooling fins of different lengths.

FIG. 9 shows a view corresponding to FIG. 8 of a further example of the second end shield 6 with straight cooling fins 9 extending from the bearing seat 15 outward to an edge or the outer surface with the intake openings 7 and blow-out openings 8. The cooling fins 9 thus extend in a straight manner in the direction of a volume flow of the cooling medium. FIG. 10 shows a further variation of the second end shield 6 in which the cooling fins 9 alternately have different lengths. Thus, cooling fins 9 that are offset in multiple rows are present in the direction of the volume flow. In some implementations, it is also possible for a plurality of cooling fins 9 that are offset from one another and/or provided with different spacings from the bearing seat 15 to be used.

Figure 11:
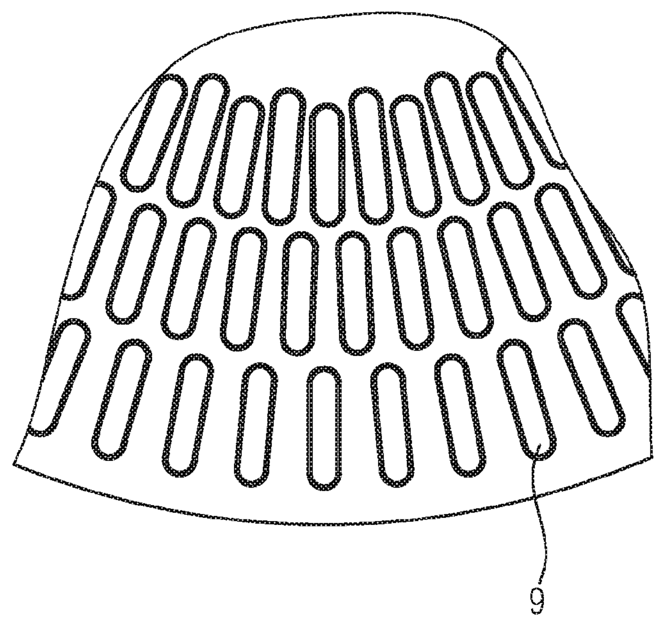
FIG. 11 shows an enlarged plan view of straight cooling fins.
Figure 12:
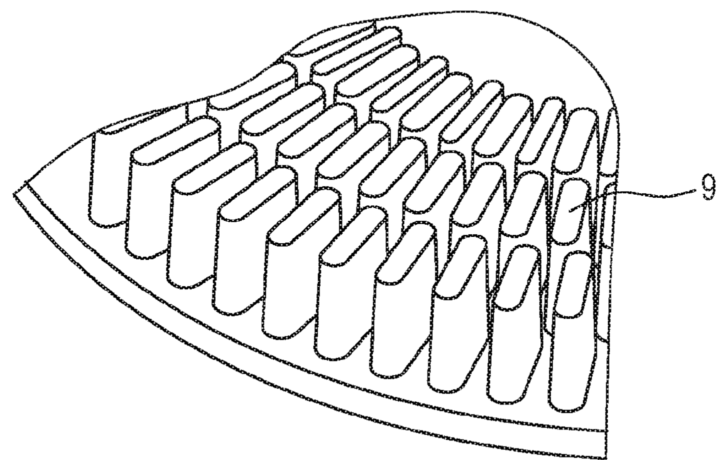
FIG. 12 shows a perspective view of the cooling fins shown in FIG. 11.

An enlarged plan view of straight cooling fins 9 that are arranged in a manner offset from one another in a plurality of rows is shown in FIG. 11, while FIG. 12 shows a corresponding perspective view.

Figure 13:
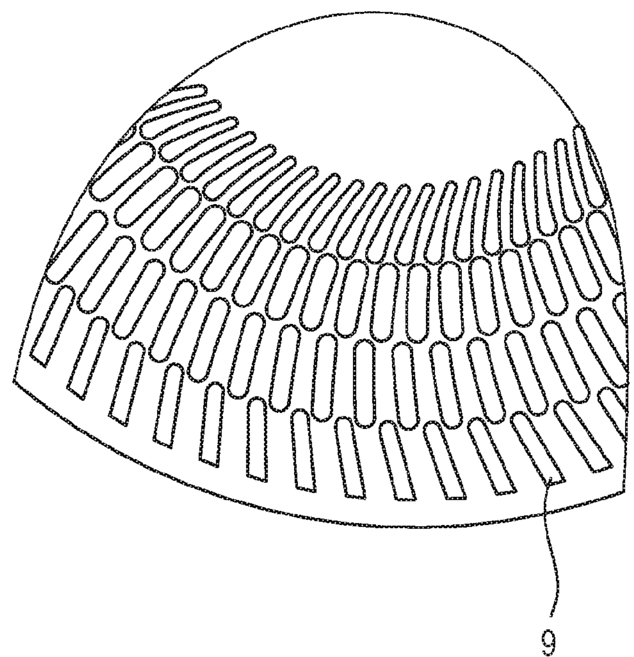
FIG. 13 shows an enlarged plan view of curved cooling fins.
Figure 14:
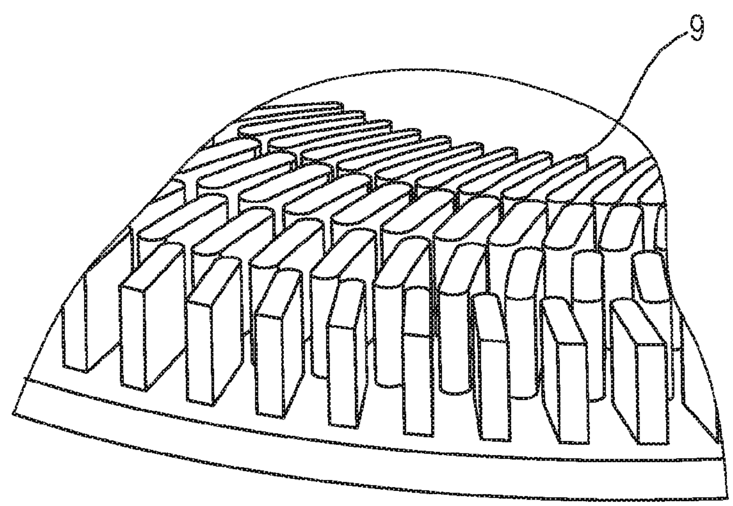
FIG. 14 shows a perspective view of the cooling fins shown in FIG. 13.

FIG. 13 shows a view corresponding to FIG. 11 of curved cooling fins 9 that are arranged in four rows that are offset from one another, while in FIG. 14, these cooling fins 9 are illustrated in a view corresponding to FIG. 12.

Figure 15:
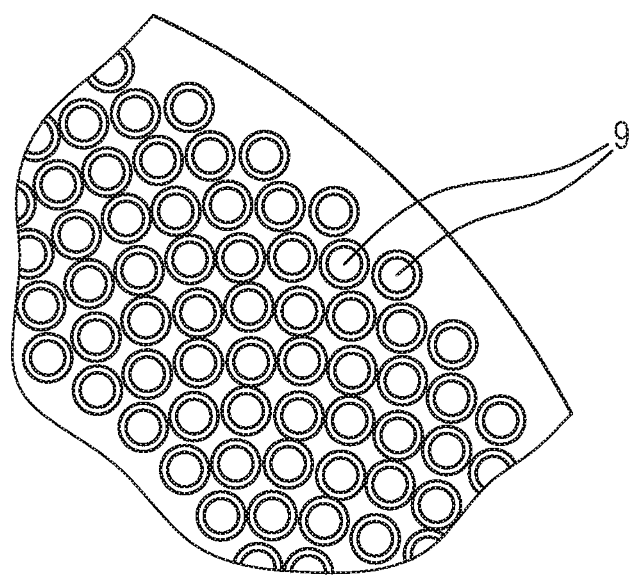
FIG. 15 shows an enlarged plan view of round cooling fins.
Figure 16:
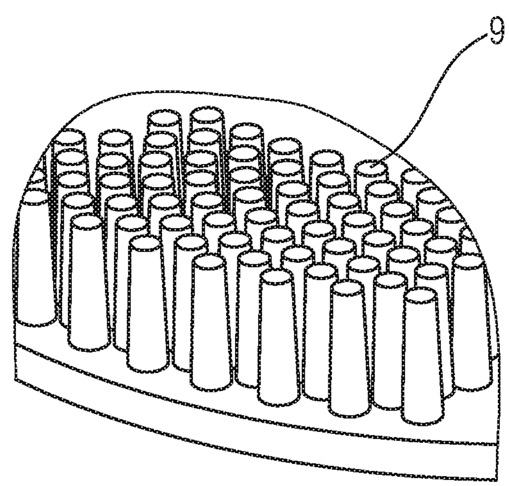
FIG. 16 shows a perspective view of the cooling fins shown in FIG. 15.

As FIG. 15 shows, in a view corresponding to FIG. 11, it is also possible to use needle fins, that is to say cooling fins 9 having a circular cross section in plan view. FIG. 16 shows a perspective view of this example in a manner corresponding to the illustration in FIG. 12.

A number of implementations have been described. Nevertheless, it will be understood that various modifications may be made without departing from the spirit and scope of the disclosure. Features of the various examples and implementations that are disclosed only can be combined with one another and claimed separately. Accordingly, other implementations are within the scope of the following claims.

What is claimed is:

1. An electric machine comprising:

a stator;

an inverter arranged in an inverter housing;

a first end shield;

a second end shield arranged in or on the inverter housing;

a rotor mounted in the stator so as to be rotatable about an axis of rotation with its rotor axis in the first end shield and the second end shield, the rotor comprising:

impeller blades; and an air guiding sleeve having blades or an air guiding sleeve without blades, the air guiding sleeve is mounted on the rotor axis and surrounded by the impeller blades;

at least one intake opening and at least one blow-out opening arranged in a radially encircling outer surface of the second end shield;

at least two cooling fins present on the second end shield;

a baffle positioned between the cooling fins of the second end shield and the stator; and a cooling medium flowing in radially through the at least one intake opening, the cooling medium is guided to the at least one blow-out opening.

2. The electric machine of claim 1, wherein the rotor further comprises:

a respective short-circuiting ring at two mutually opposite end sides that face in a direction of the end shields; and the impeller blades are arranged or formed on the short-circuiting ring.

3. The electric machine of claim 2, wherein the impeller blades are curved counter to a direction of rotation of the rotor in the electric machine.

4. The electric machine of claim 1, wherein the cooling fins on the second end shield extend radially outwardly from a bearing seat.

5. The electric machine of claim 4, wherein the cooling fins on the second end shield alternately have different lengths.

6. The electric machine of claim 1, wherein, the cooling fins encircle a bearing seat of the second end shield and are arranged in at least two mutually offset rows with different spacings from the axis of rotation.

7. The electric machine of claim 1, wherein the cooling fins are formed with a cross section that is circular or extends in a straight or curved manner from a direction of the axis of rotation as seen in plan view.

8. The electric machine of claim 1, wherein the second end shield and the inverter housing are formed in one piece.

* * * * *